United States Patent [19]

Kozlowski

[11] 4,100,835

[45] Jul. 18, 1978

[54] BRAIDED PACKING

[75] Inventor: Peter F. Kozlowski, Billerica, Mass.

[73] Assignee: A. W. Chesterton Company, Stoneham, Mass.

[21] Appl. No.: 754,254

[22] Filed: Dec. 27, 1976

[51] Int. Cl.$^2$ ............................................. D04C 1/06
[52] U.S. Cl. ........................................ 87/1; 64/1 R; 87/6; 308/121
[58] Field of Search ................... 87/1, 5–8; 64/1 R; 308/121, 134.1

[56] References Cited

U.S. PATENT DOCUMENTS

| | | | |
|---|---|---|---|
| 239,287 | 3/1881 | Winans | 87/6 |
| 731,458 | 6/1903 | Hughes et al. | 87/6 X |
| 741,056 | 10/1903 | Montgomery | 87/6 |
| 1,446,141 | 2/1923 | Adams, Jr. | 87/6 |
| 1,771,912 | 7/1930 | Blasidell | 87/6 |
| 1,930,766 | 10/1933 | Moore | 87/6 |
| 2,221,453 | 11/1940 | Miller | 87/6 X |
| 3,124,032 | 3/1964 | Webster et al. | 87/1 |
| 3,403,595 | 10/1968 | Watson | 87/1 |
| 3,646,846 | 3/1972 | Houghton et al. | 87/1 |
| 3,805,667 | 4/1974 | Orser | 87/6 |

*Primary Examiner*—John Petrakes

[57] ABSTRACT

A braided packing comprises a plurality of braid strands braided about a plurality of core strands, the braid strands extending and forming on the packing surface a pattern extending helically in one direction and forming with said core strands an elongated braid having a normal twist extending helically in the opposite direction.

9 Claims, 6 Drawing Figures

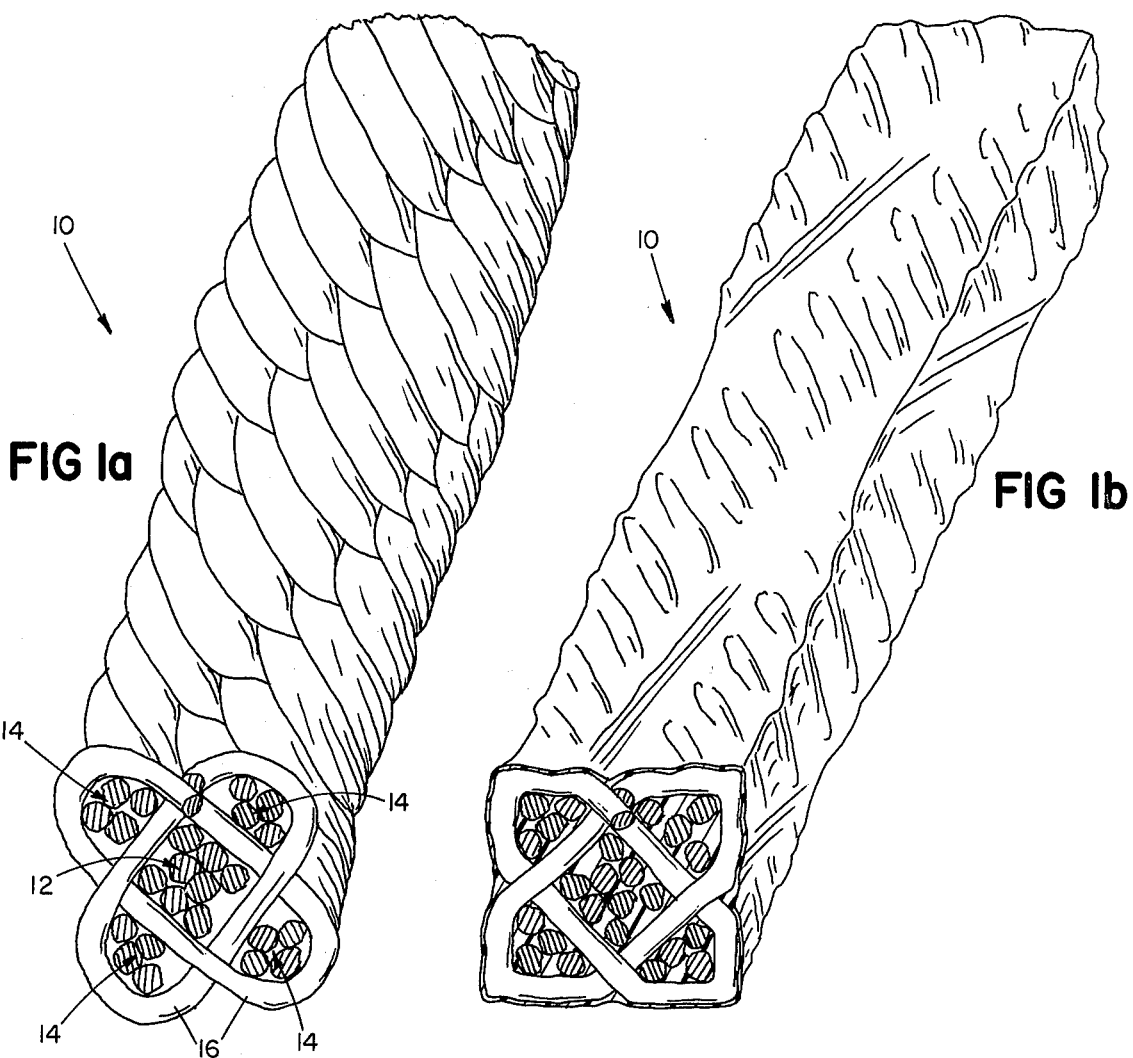
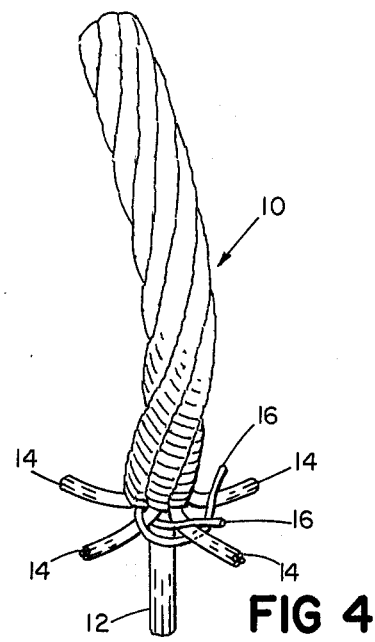
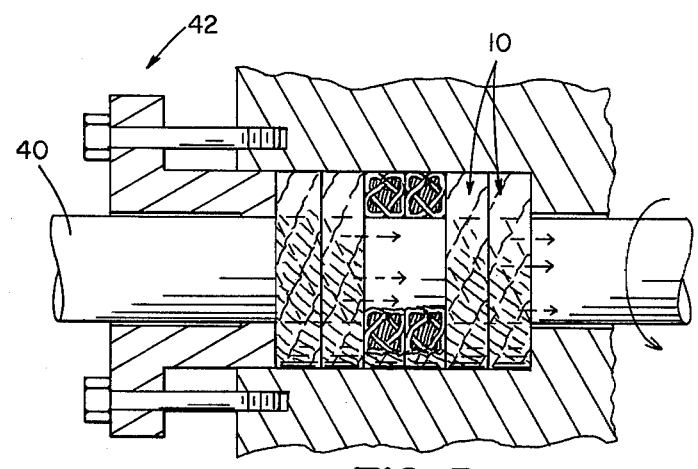

BRAIDED PACKING

This invention relates to packings and more particularly to braided packings comprising a plurality of strands braided together.

Braided packings are used extensively in industry for a variety of sealing purposes. Typically packings are made of flax, jute, asbestos or synthetic, such as polytetraflouroethylene, fibers which are formed into yarns or strands and which are braided together about core strands. The result is typically a packing having a square cross-section and herringbone weave pattern extending in an axial direction along the packing; typical such packings are illustrated in U.S. Pat. No. 3,646,846.

Unfortunately, when prior art packings are wrapped around a shaft, they do not provide a uniform fiber density. As they are wrapped about a shaft, the packing fibers at the inner diameter are compressed and those at the outer diameter are elongated. The result, with an initially square cross-section packing, is a trapezoidal cross-section providing a leakage path larger at the outer diameter than at the inner diameter. Additionally, the sealing characteristics of typical packings are static and substantial compression is required to effect sealing. Compression of the packing to control leakage causes increased pressure on the shaft and forces out lubrication from the packing, overheating and shortening the life of the packing and contributing to shaft wear.

Accordingly, it is a principal object of this invention to provide a packing which has improved uniformity of cross-sectional density when wrapped about a shaft or the like reducing compression required for sealing and which will contribute to improved packing life and reduced shaft wear. A further object is to provide a packing which with a rotating shaft has hydrodynamic sealing characteristics further reducing compression required for sealing. It is a further object of this invention to produce such a packing which can be manufactured simply and economically on conventional machinery.

In general, this invention features a packing comprising a plurality of strands braided together to form an elongated braid having a normal twist extending in one direction and in which the braid strands extend in a continuous helical pattern in the opposite direction.

In preferred embodiments the packing comprises a central core strand and a plurality of outer core strands equidistantly spaced around the central strand. The outer core strands extend helically along the packing in one direction. The braid strands extend over the outer core strands and then under the next adjacent outer core strands passing between the braid strands which extend over the adjacent outer core strands. The normal twist of the braid is formed by the ridges of the braid strands passing over the outer core strands and the grooves formed therebetween. The packing is impregnated with lubricant and has a generally square cross-section. In the illustrated embodiment the packing comprises four outer core strands and two sets of six braid strands braided about the outer core strands.

The invention also features the packing in combination with a rotatable shaft with the helical twist at an acute angle to the shaft axis facing against the direction of the shaft rotation and facing the shaft end from which it is desired to prevent fluid flow. The helical twist causes fluid to be pumped toward said shaft end as the shaft rotates.

Other objects, features and advantages of the invention will be apparent to those skilled in the art from the following detailed description of a preferred embodiment taken together with the accompanying drawings, in which:

FIG. 1A is an isometric view of a packing according to the invention showing somewhat diagramatically a cross-section of the packing;

FIG. 1B is a view similar to that of FIG. 1A illustrating the packing impregnated and formed to a generally square cross-sectional configuration;

FIG. 4 is an isometric view of the packing partially illustrating the braiding of the packing strands; and FIG. 5 is a sectional view of a stuffing box illustrating the packing in use on a rotary shaft.

Figure 2:
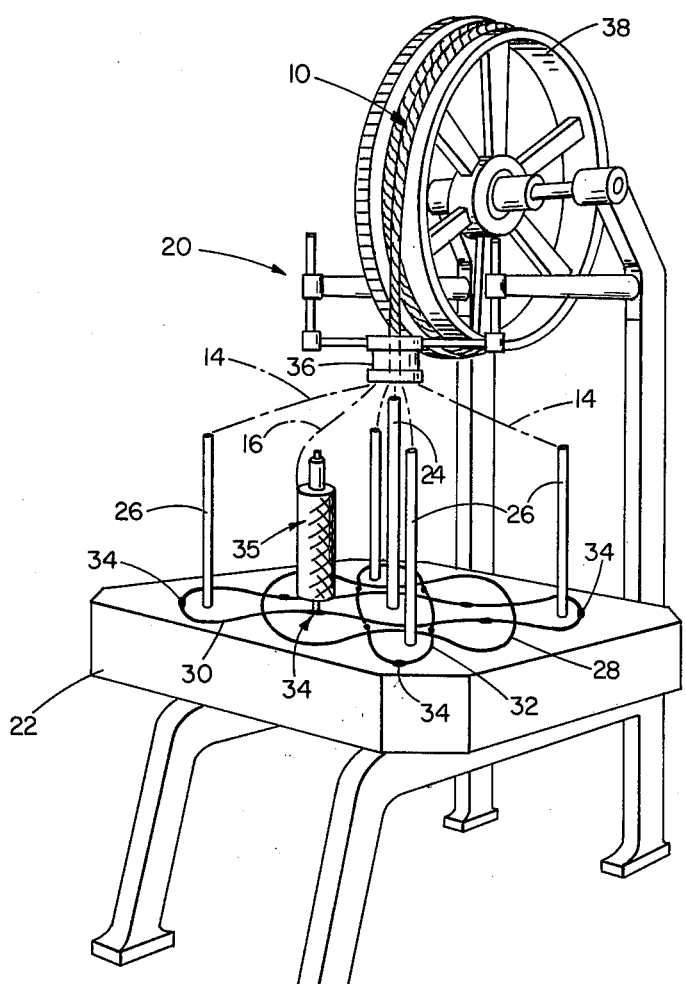
FIG. 2 is an isometric somewhat diagramatic view of a braiding machine utilized in making the packing.

The packing construction is illustrated in FIGS. 1A, 1B, and 4. As illustrated the packing 10 comprises a central core strand 12 and a plurality, four in the illustrated embodiment, of outer core strands 14. Each of the core strands 12, 14 comprises a plurality of yarns of selected packing fibers. Braided around the core strands are a plurality of braid strands 16.

Braid strands 16 are interwoven about the outer core strands 14, each braid strand 16 extending over one outer core strand 14 on the packing surface, under the next adjacent outer core strand adjacent the central core strand 12, over the next adjacent outer core strand 14 and continuing in that pattern along the length of the packing 10. The braid strands 16 all extend generally helically in a single direction presenting a helical pattern of parallel braid strands 16 on the packing surface.

The braid strands 16 extending over and beyond one outer core strand 14 extend between braid strands 16 on the next adjacent outer core strand as they then extend thereunder. The result is a major braid pattern, defined by raised ridges as the braid strands 16 pass over the outer core strands 14 with grooves therebetween. The outer core strands 14 extend helically along the packing surface in a direction opposite the helical direction in which the braid strands 16 extend and, together with the braid strands forming ridges and grooves, define a braid having a normal helical twist of the major braid pattern opposite the helical direction of the braid strands.

Figure 3:
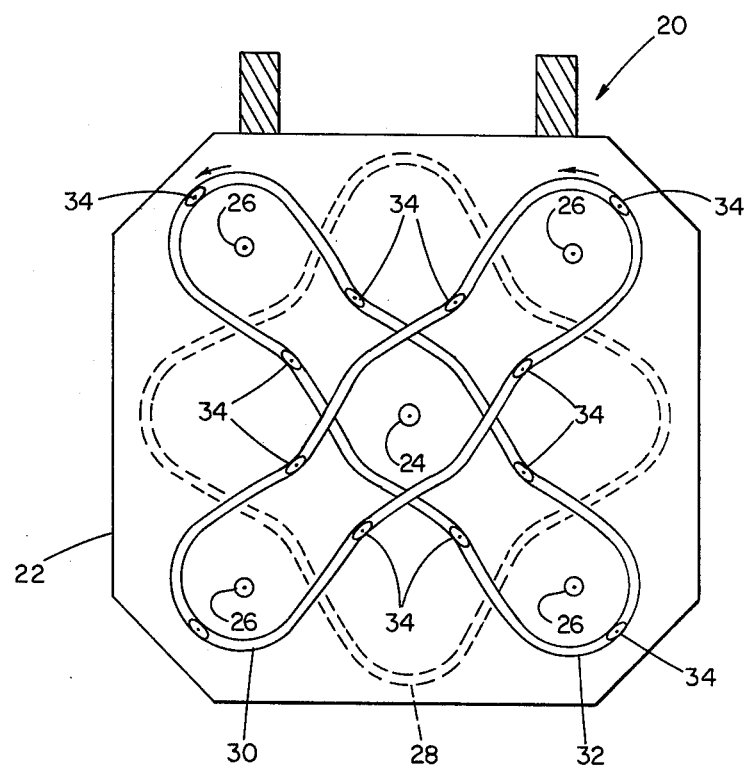
FIG. 3 is an enlarged diagrammatic plan view of the carrier table of the braiding machine of FIG. 2.

To make a packing 10, as thus described, a conventional braiding machine 20, illustrated in FIG. 2 is employed. Braiding machine 20 comprises a carrier table 22 having a plurality of tubular masts 24, 26 through which core strands 12, 14 extend from sources, not shown. Mast 24 for central core strand 12 is centrally positioned in table 22. Four masts 26 for outer core strands 14 are equidistantly positioned about the table. On the surface of the table 22 of braiding machine 20 are three carrier tracks 28, 30, 32. Track 28 has a generally square configuration extending around central mast 24 and inside of the four masts 26. Tracks 30, 32 extend diagonally and cross each other, one track 30 extending on the outside of two diagonally opposite masts 26 and the other track extending on the outside of the other two diagonally opposite masts 26. A plurality of carriers 34 are located in each track carrying bobbins 35 (only one is illustrated in FIG. 2) of braid strand 16. As best shown in FIG. 3, six carriers 34 are utilized on each tracks 30, 32 equidistantly spaced therealong and in the identical patterns on each track, all moving in the counterclockwise direction indicated by the arrows in FIG. 3. The square track 28 is disabled and is not utilized. As thus set up, with a central core strand 12 extending from mast 24, with four outer core strands extending from masts 26, and with six braid strands 16 extending from the carriers 34 on each track 30, 32 braiding proceeds in a normal manner with the strands extending through a condenser 36 and the resulting braided packing being taken off by wheel 38.

Initially, the packing 10 has a generally circular cross-section as shown in FIGS. 1A and 4. After removal from the braiding machine the packing 10 may be impregnated with lubricating material, as is conventional. Thereafter, the packing is pressed in a conventional manner to the square cross-sectional configuration illustrated in FIG. 1B.

In use, the packing may be installed about a shaft 40 as shown in FIG. 5. Advantageously, the cross-sectional density of the packing has improved uniformity in comparison to prior art braided packings. The cross-sectional configuration of the packing also remains relatively square during installation. Advantageously, less pressure of gland 42 is therefore required to cause proper sealing by the packing. As a result, heating of the packing due to friction with the shaft is reduced. Lubricant is retained, packing life is improved and shaft wear is reduced.

An additional advantage results from the helical braid twist. The grooves between the positions of the outer core strands provide a flow path on the shaft surface providing additional packing lubrication. The braid helix, on the other hand, can be oriented, as illustrated in broken lines in FIG. 5, relative to shaft rotation to, in effect, pump fluid back in a predetermined direction to further resist actual leakage. The braid helix is oriented with the twist, i.e., the ridges and grooves, extending at an acute angle to the shaft axis, indicated by broken lines in FIG. 5, facing against the direction of shaft rotation and facing the end of the shaft from which it is desired to prevent fluid flow, indicated by the direction in which the broken arrows point in FIG. 5. The fluid is pumped toward the shaft end from which it is desired to prevent fluid flow or toward which it is desired to flow the fluid. This hydrodynamic sealing feature further reduces gland pressure required for sealing with attendant advantages as above set forth.

Other embodiments of this invention will be apparent to those skilled in the art which are within the scope of the following claims.

What is claimed is:

1. Braided packing comprising a plurality of outer core strands extending generally axially along said packing and a plurality of braid strands braided together about said core strands, said outer core strands extending helically along said packing and forming with said braid strands a braid having a normal helical twist in one direction and said braid strands extending over said core strands in a continuous helical pattern in a direction opposite said one direction.

2. The packing claimed in claim 1 further comprising a central core strand extending axially along said packing centrally of said outer core strands, said outer core strands spaced equidistantly thereabout.

3. The packing claimed in claim 1 in which each braid strand extends over one outer core strand and under the next adjacent outer core strand between braid strands extending over said next strand, ridges thereby formed over said helically extending outer core strands and grooves formed therebetween.

4. The packing claimed in claim 3 further comprising a central core strand extending axially along said packing centrally of said outer core strands, said outer core strands spaced equidistantly thereabout.

5. The packing claimed in claim 4 having four outer core strands and two sets of six braid strands braided about said outer core strands.

6. The packing claimed in claim 4 in which said packing has a generally square cross-section.

7. The packing claimed in claim 6 in which said packing is impregnated with solid lubricant.

8. The packing claimed in claim 7 having four outer core strands and two sets of six braid strands braided about said outer core strands.

9. The packing claimed in claim 1 in combination with a shaft normally rotatable in one predetermined direction, said packing extending about said shaft with said normal helical twist extending at an acute angle to said shaft axis facing against the predetermined direction of shaft surface rotation and facing the end of the shaft from which it is desired to prevent fluid flow, whereby fluid at said shaft surface will be pumped toward said shaft end when said shaft rotates in said predetermined direction.

* * * * *